United States Patent Office 3,172,807
Patented Mar. 9, 1965

3,172,807
METHOD OF STIMULATING APPETITE AND RELIEVING PARKINSON'S SYMPTOMS
Frederick W. Proewig, Wantagh, N.Y., assignor to Spanel Foundation Inc., New York, N.Y., a non-profit foundation of Delaware
No Drawing. Filed July 25, 1962, Ser. No. 212,459
5 Claims. (Cl. 167—55)

This invention relates to a tonic for stimulating anabolism in humans.

It is a principal object of this invention to provide a method for stimulating anabolism in humans, which method when used gives the user a feeling of invigoration.

It is another object of this invention to provide a method of stimulating the appetite in humans which, therefore, can be used by those who desire to gain weight and find it difficult to do so without appetite stimulation.

Other objects and advantages of this invention will be apparent from the following detailed description thereof.

In accordance with this invention, furfural or furoic acid is administered orally in doses of from 0.2 to 3 cc. over 24 to 48 hours, preferably over 48 hours. Administration can be effected in capsule form, each capsule containing from 0.2 to 1 cc. of furfural or furoic acid. Any desired known capsulating agent, such as gelatin, which dissolves readily in the stomach fluids, can be used. Instead of capsule administration, the furfural or furoic acid admixed with glycerin in the proportions of about 1 gram of furfural or furoic acid per 15 cc. of glycerin can be administered as a liquid or syrup by swallowing same.

The dosage administered is dependent on the age and the weight of the recipient. For children in the age group of from 5 to 15 years, the dosage should be from 0.2 to 0.5 cc. per 24 to 48 hours, preferably per 48 hours. For adults greatly below average weight for their age and height, the dosage should be from 1.0 to 3.0 cc. per 24 to 48 hours, preferably per 48 hours. For those adults whose weight for their height is close to average, the dosage should be from 0.5 to 1.0 cc. per 24 to 48 hours, preferably per 48 hours. For adults of normal weight or overweight to whom the tonic is administered for purposes of giving them a feeling of invigoration, the dosage should be from 0.5 to 1.0 cc. per 24 to 48 hours, preferably per 48 hours.

Administration after meals, desirably after breakfast, is preferred.

The administration of furfural or furoic acid to those having Parkinson's disease has been found to relieve tremor and retropulsion. When administered for this purpose, the dosage is preferably two capsules daily, each capsule containing from 0.5 to 1.0 cc. of furfural or furoic acid, about 12 hours apart. Instead of the capsule, a like amount of furfural or furoic acid in glycerin can be administered orally as a syrup or solution to be swallowed.

While the explanation for the effectiveness of furfural and furoic acid, when administered as herein disclosed, in relieving tremor and retropulsion in those having Parkinson's disease is not fully understood, it is believed that furfural and furoic acid have substantially the same effect as dopa (dihydroxyphenylalanine, a known therapeutic agent for relieving symptoms of Parkinsonism), a chemically related compound, except that the effects of furfural and furoic acid are longer lasting, namely, about twenty-four hours for a single dose of either furfural or furoic acid as against about two hours therapeutic duration for a single dose of dopa. Moreover, furfural and furoic acid are less costly and easier to administer.

The administration of furfural as hereinabove described causes a slight diuresis. Furfural and furoic acid have no harmful effects.

The furfural or furoic acid used is the pure grade of commerce readily available. Furfural, as is well known, is derived from oats; it is a constituent of other growths such as asparagus, barley, bean hulls, coffee beans, and corn and wheat bran. It is non-toxic to humans in the dosage employed as a tonic as herein described and for that matter even in much greater dosages. Many millions of pounds of furfural have been produced by the Quaker Oats Company and sold for industrial purposes, including as a reactant wtih amines in the production of resins, without a single case of toxicity having been reported. Furoic acid is prepared from furfural by oxidation or by the known Cannizzaro reaction.

The discovery that furfural and/or furoic acid when administered orally in the dosage herein disclosed stimulates the appetite and hence can be used when weight gain is desired and also gives the recipient a feeling of invigoration is a valuable contribution useful in stimulating anabolism in humans. Dorland's Illustrated Medical Dictionary, 23rd Edition, published by W. B. Saunders Company, Philadelphia, 1957, states that furfural "causes convulsions and paralyses in animals." This is the case only when furfural is given intravenously in toxic amounts and is due to the lipid-solvent property of furfural, yet furfural and furoic acid are non-toxic to humans and an excellent tonic for individuals when administered as herein disclosed with no harmful side effects, although furfural and furoic acid do cause slight diuresis, as do other aromatic compounds which pass into the urine.

The following explanation is given to facilitate a better understanding of this invention. This explanation is believed to be accurate; however, the invention is not limited thereto.

The essential factor causing chronic cell degeneration is the mounting deficit of metabolizable substances supplied to the cells via the blood-stream. The important part for functioning and survival of the cell is the cell-nucleus. The cell nucleus is responsible for cellular growth, multiplication and perpetuation. Without it the cell must die. For this anabolism, aliphatic amino acids are supplied by the liver to the cell, and the aromatic amino acids have to be supplied from an external source because aromatic compounds cannot be synthesized in the cell. The aromatic amino acids are therefore called "essential" amino acids. Cell-nuclei are composed mostly of purines, e.g., adenine, guanine, hypoxanthine, all of which are heterocyclic compounds which have to be supplied through the diet. The part which makes a nucleic acid or a purine essential is a five-membered ring, constituting the so-called imidazol ring, pyrrole nucleus, proline and indole nucleus.

It is therefore apparent that the cell-nucleus has to be supplied with sufficient heterocyclic compounds, i.e., five-membered ring compounds, for the purpose of anabolism so that the cell can function physiologically.

In therapy, so far, for cellular stimulation, i.e., anabolism, medicine has relied upon internal organs or their extracts to supply the necessary nucleic acids, e.g., liver in the diet or liver extract as injection. Such a therapy is handicapped by the fact that the nucleo-proteins supplied have to be processed by the liver, that intestinal absorption adds another question mark to the nucleo-proteins of the diet.

Furfural is a five-membered ring compound; its formula is:

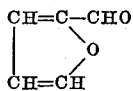

Furoic acid is also a five-membered ring compound. Its formula is:

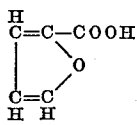

Both furfural and furoic acid have relatively small molecules and hence are readily adsorbable when administered orally, enter the bloodstream readily, and are taken up from the bloodstream by the cells and become readily available for the anabolism of the neucleus.

In one case of an adult twenty-four pounds under average weight for his height and age, the administration of one capsule containing 1 gram of furfural 3 times every 24 hours for 25 days resulted in a gain of 24 pounds.

In the case of a barber who developed fine tremors of his hands which rendered it impossible for him to work, the administration of 1 gram daily caused stoppage of the tremor and enabled the person to continue his profession as a barber.

In the case of a watch repairer who was unable to work because of a fine tremor in his hands, the administration of 1 gram of furoic acid per 24 hours for 2 weeks resulted in loss of the tremor and enabled him to return to the work of repairing watches.

Individuals to whom furfural or furoic acid were administered as herein disclosed have uniformly and consistently shown stimulation of the appetite, gain in weight and a feeling of well being.

It will be understood that the invention is not limited to the above disclosure except as set forth in the appended claims.

What is claimed is:

1. A method of stimulating appetite in humans which comprises oral administration of from .2 to 3 cc. of a compound selected from the group consisting of furfural and furoic acid at intervals of about 24 to 48 hours.

2. The method of claim 1, in which the compound is administered in capsule form.

3. The method of claim 1, in which the compound is administered as a liquid.

4. The method of claim 3, in which the compound is administered as a syrup admixed with glycerin in the proportions of about 1 gram of compound per 15 cc. of glycerin.

5. The method of treating humans having Parkinson's disease to give relief from tremor and retropulsion, which method consists essentially of orally administering to such humans from .5 to 1.0 cc. of a compound selected from the group consisting of furfural and furoic acid at approximately 12 hour intervals.

References Cited in the file of this patent

Windsor: Chem. Abst., vol. 47, 1953, p. 4473(b).
Remington's Practice of Pharmacy, 1956, pp. 389 and 635.
Saito: Chem. Abst., vol. 48, 1954, p. 9024c.
Wensinck: Chem. Abst., vol. 47, 1953, p. 4473(b).
Hoshi: Chem. Abst., vol. 53, 1959, p. 1544(a).